Figure 1:
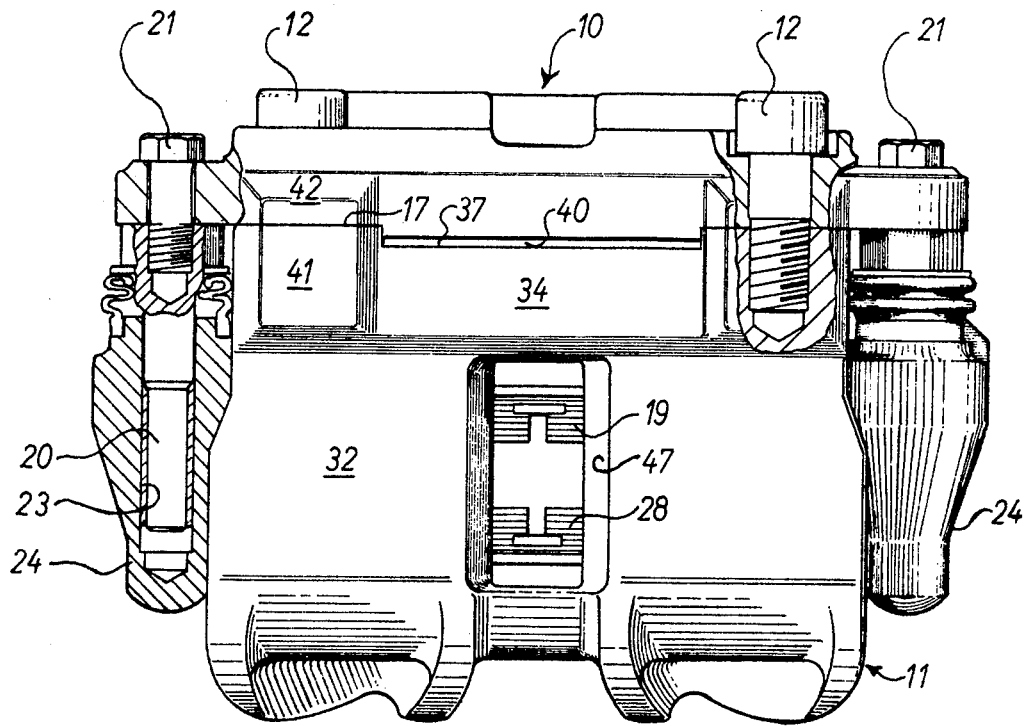

United States Patent [19]

Brix et al.

[11] 4,094,389
[45] June 13, 1978

[54] DISC BRAKES

[75] Inventors: Hermann Josef Brix, Koblenz; Hans-Jurgen Wienand, Steimel, both of Germany

[73] Assignee: Girling Limited, Birmingham, England

[21] Appl. No.: 781,989

[22] Filed: Mar. 28, 1977

[30] Foreign Application Priority Data

Apr. 1, 1976 United Kingdom ............ 13264/76

[51] Int. Cl.² ........................................... F16D 55/224
[52] U.S. Cl. .................................................. 188/73.3
[58] Field of Search ............ 188/71.1, 73.1, 73.3–73.6

[56] References Cited

U.S. PATENT DOCUMENTS 3,482,655  12/1969  Walther ........................ 188/73.3 X
4,027,750  6/1977  Kawamoto et al. ................ 188/73.3

FOREIGN PATENT DOCUMENTS 2,547,083  6/1976  Germany ........................ 188/73.3

Primary Examiner—Duane A. Reger
Attorney, Agent, or Firm—Scrivener, Parker, Scrivener and Clarke

[57] ABSTRACT

A disc brake caliper consists of a body member including a cylinder portion, and a bridge member attached to the body member by two bolts. The body and bridge members of the caliper abut one another at two pairs of parting faces lying in a common plane, aligned bolt holes for the two bolts being formed in the parting faces. The cylinder portion of the body member extends axially beyond the parting plane so that a recessed portion of the bridge member overlies but is spaced from the cylinder portion to form an air pocket which is adequately vented. The two parting faces on the body member can be machined simultaneously by means of two broaching tools which clear the cylinder portion.

6 Claims, 11 Drawing Figures

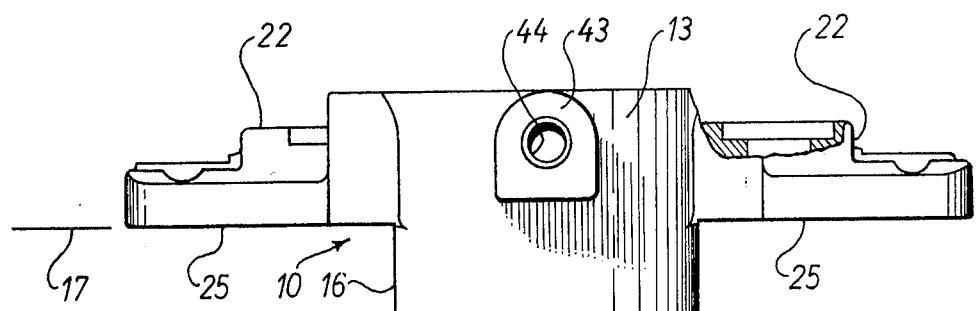
FIG 3.
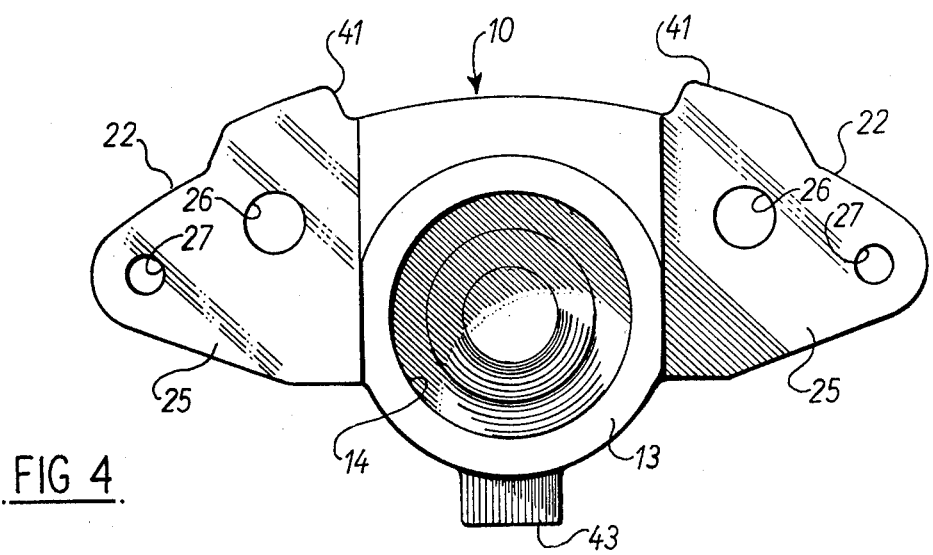
FIG 4.
FIG 5.
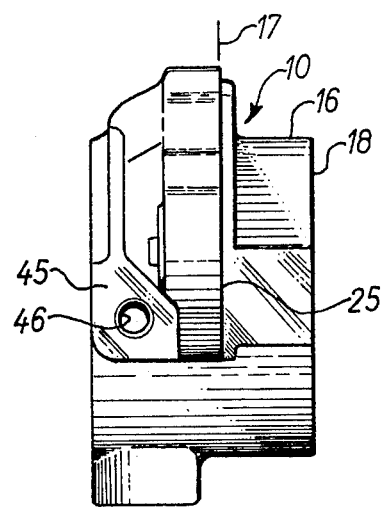

DISC BRAKES

The present invention relates to disc brakes and more particularly to a disc brake caliper which comprises a body member and a bridge member bolted together.

It is common practice to manufacture a single-sided disc brake caliper as separate halves or members which are bolted together since this simplifies casting and improves access for subsequent machining particularly machining of the cylinder bore in the body member. This simplification more than offsets the extra cost of providing the bolts and the holes for the bolts.

The abutment or parting faces between the body and bridge members of the caliper have to be machined flat and this is usually done by broaching which is relatively cheap. The abutment face on the bridge member is easy to machine since it is an extreme end face. Likewise so long as the cylinder of the body member does not project as far forward as the abutment face on the body member the latter face is also easy to machine since it is possible to broach this surface without having to clear any parts of the body member.

The holes for the bolts must be surrounded by a suitable thickness of metal and the bolts themselves must be of a sufficient diameter to hold the members tightly together against the brake clamp load. Due to the limited clearance between the outer periphery of the disc and the vehicle wheel the bolts must be arranged at one side of the disc rather than outside its periphery. Sometimes difficulty arises in finding sufficient room to accommodate the necessary thickness of metal in the region of the bolt holes without having the cylinder project forwardly beyond the parting plane. The use of more, thinner bolts, though effective in reducing the required radial space, generally increases the expense. Furthermore if the cylinder does project forwardly beyond the parting plane an air pocket is formed between the forwardly projecting portion of the cylinder and a portion of the bridge member which overlies this projecting portion of the cylinder. When the brake is applied this car will become hot.

According to the present invention, a disc brake caliper comprises a body member and a bridge member bolted together by two bolts, in which the body member has two separate co-planar parting faces with respective bolt holes therein and a cylinder a portion of which projects forwardly beyond the parting plane, and in which the bridge member has two complementary parting faces with respective bolt holes therein and a recessed or relieved portion between such parting faces.

Thus the two parting faces of the body member can be machined simultaneously by means of respective broaches which clear the projecting portion of the cylinder, thus reducing manufacturing time. The respective broaches may both be mounted on the same bolster of the broaching machine so that, once set up, they remain co-planar. Also the recess or relieved portion of the bridge member not only provides a clearance for unmachined parts of the body member but also provides a gap for the ventilation of the above-mentioned air pocket.

The recess or relieved portion of the bridge member can be machined but is preferably formed by casting.

A single-sided caliper must be able to move axially of the disc in the case of a fixed disc in order that the bridge member can apply a reaction force to the indirectly operated brake pad. It is convenient to mount the body member for sliding movement relative to a fixed support by means of axially directed pins. It is convenient to provide holes in the body member for receiving or for the attachment of such pins, which holes are in the two parting faces on the body member.

The invention is not applicable to those brakes in which the pads, for servicing purposes, can be removed radially through a gap in the caliper. The friction pads have of course a substantial circumferential length, and therefore an aperture provided in the bridge to allow their withdrawal, if provided, is also correspondingly large. Therefore, in effect, the disc straddling portions of the bridge member of such a caliper comprise two widely spaced tension links. These must be joined together by a beam to transfer the clamp force to the outboard pad. The more widely spaced the two links, the more substantial the outboard beam must be. A thick beam however interferes with the installation space between the outboard pad and the road wheel. When the caliper is of the type, as with the invention, that the pads are not withdrawable through an aperture in the caliper, then the part of the bridge member which is further outboard then the outboard pad has minimum "swept" dimensions, i.e. the member interferes to a minimum extent with the installation space. In many cases, the space available in the road wheel for the brake will only accommodate this minimum swept form and the use of a brake caliper according to the invention permits this. An aperture of small circumferential width may be provided to permit inspection of the state of pad wear, without making necessary a substantial outboard beam.

Figure 2:
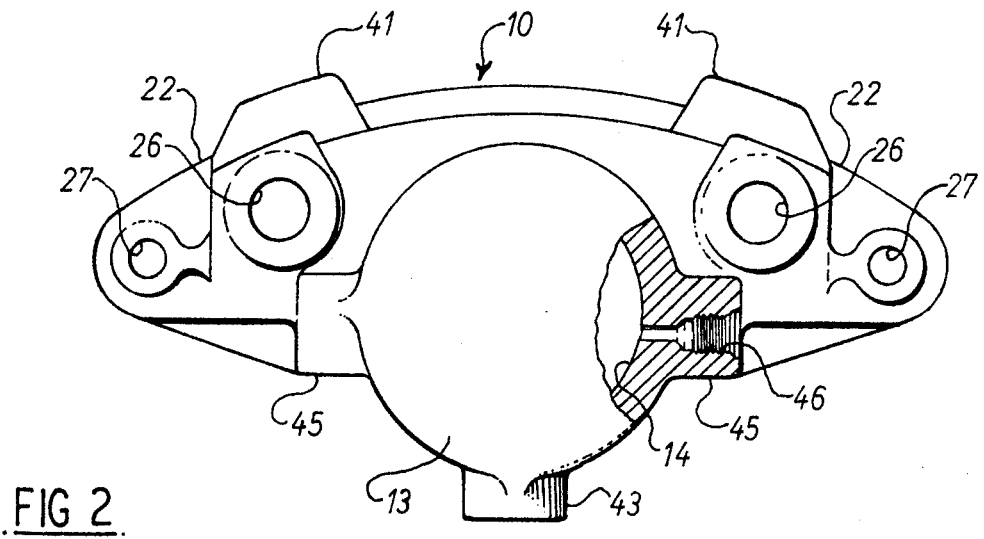
Figure 6:
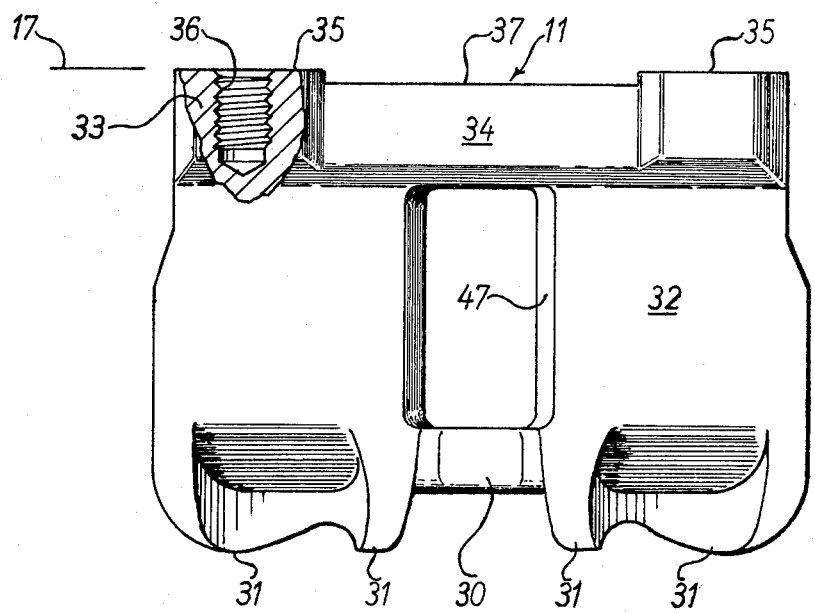
Figure 7:
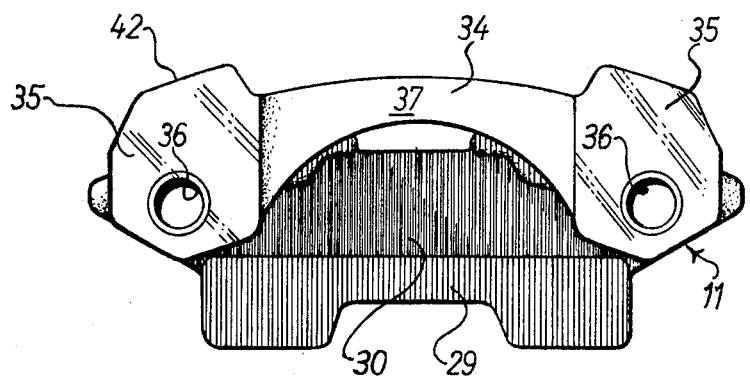
Figure 8:
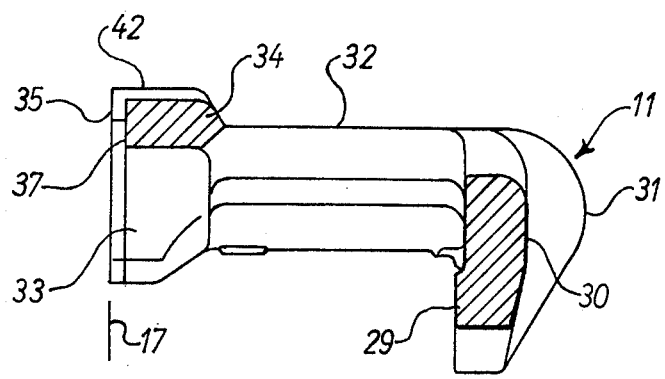
Figure 9:
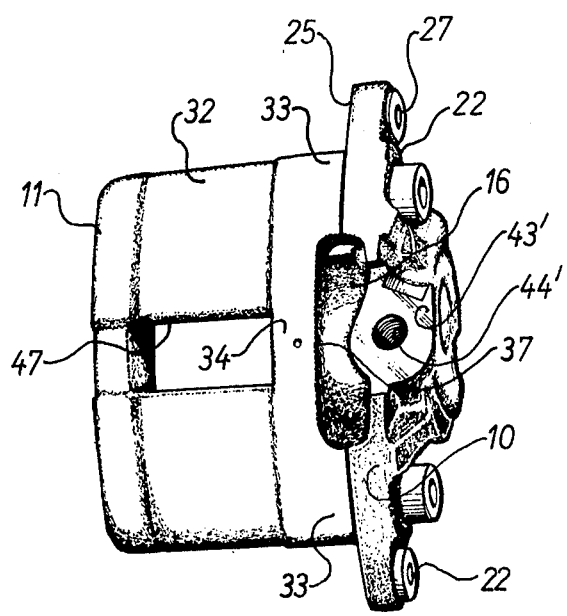
Figure 10:
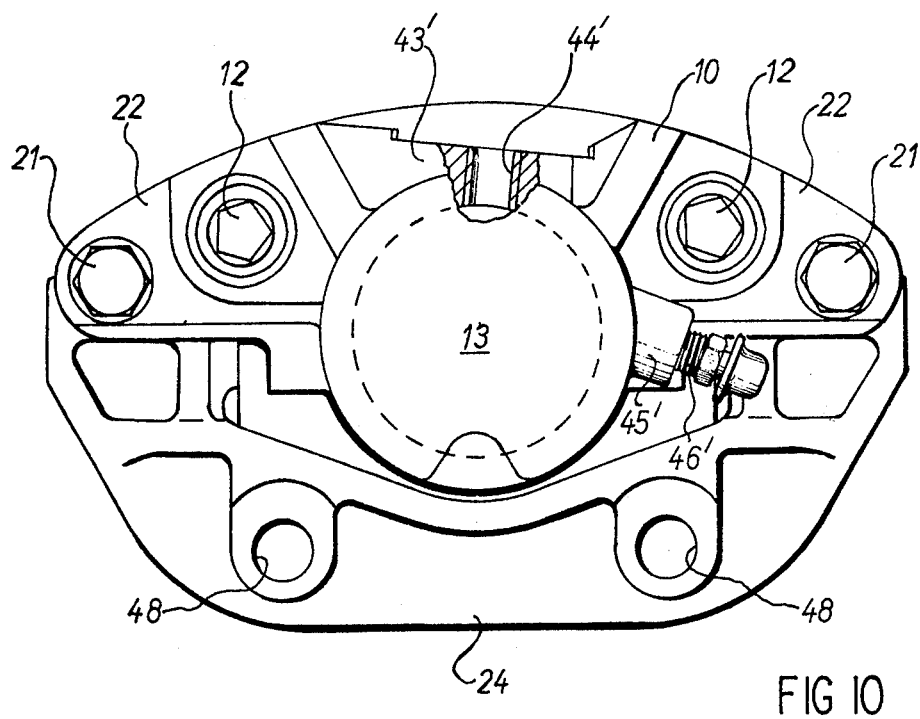
Figure 11:
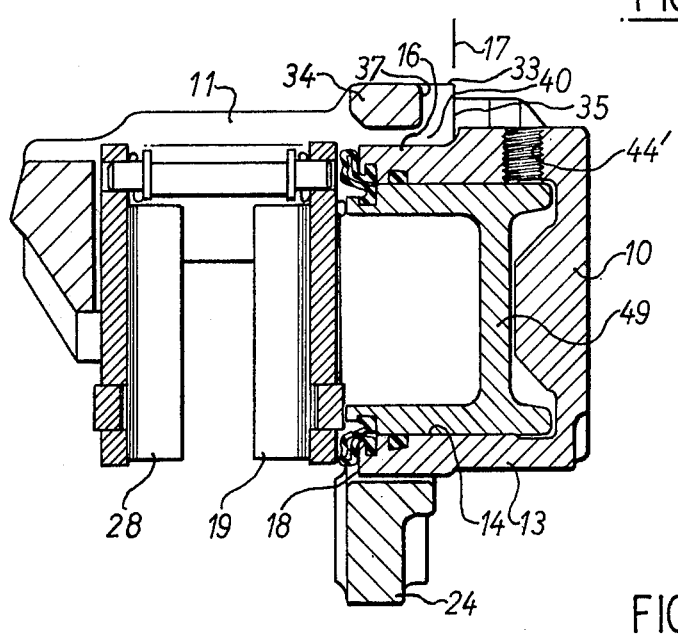

The invention is further described, by way of example, with reference to the accompanying drawings in which:

FIG. 1 is a plan view of a brake caliper constructed according to one embodiment of the present invention and mounted on a fixed support, FIG. 2 is an end view of the body member of the caliper of FIG. 1, viewed from the inboard side, FIG. 3 is an inverted plan view of the body member, FIG. 4 is an end view of the body member from the outboard side, FIG. 5 is a side view of the body member, FIG. 6 is a plan view of the bridge member of the caliper of FIG. 1, FIG. 7 is an end view of the bridge member from the inboard side, FIG. 8 is a longitudinal sectional view of the bridge member, FIG. 9 is a perspective view, from above, of another embodiment of disc brake caliper according to this invention, FIG. 10 is an end view of the caliper of FIG. 9 mounted on a fixed support, and FIG. 11 is a longitudinal section of the caliper of FIGS. 9 and 10.

Referring now to FIG. 1 of the drawings, a single-sided disc brake caliper comprises a body member 10 and a bridge member 11 secured to one another by two bolts 12, which are axially parallel to one another and to the rotary axis and are disposed at opposite sides of a cylinder 13 (see FIGS. 2 to 5). As can be clearly seen in FIGS. 3 and 5, the cylinder 13 includes a portion 16 which projects forwardly (i.e. in the outboard direction when the cylinder is disposed at the inboard side of the disc) of the parting plane 17. The cylinder bore 14 is bored from the forward end face 18 of the cylinder 13 to accommodate the piston (not shown but see the piston in FIG. 11) which acts on the directly operated brake pad 19.

As can be clearly seen in FIGS. 3 and 4 the body member 10 has two laterally projecting ears 22 on which respective parting or abutment faces 25 in the parting plane 17 are machined. Because the cylinder portion 16 projects forwardly of these abutment faces 25 the abutment faces 25 cannot be machined simultaneously by means of a single broaching tool. However they are disposed at opposite sides of the forwardly projecting cylinder portion 16 so that they can be machined simultaneously by means of respective separate broaching tools. In this way the time which could be wasted in separate machining operations for the two parting or abutment faces 25 is avoided.

As can be seen from FIG. 1, the body member 10 is mounted for axial sliding movement by means of pins 20 which are secured by bolts 21 to the laterally projecting ears 22 of the body member 10. The pins 20 are axially slidably received in bores 23 in a fixed support 24, only two small portions of which are visible in FIG. 1.

As can be seen in FIGS. 2 and 4, holes 26 for the clamping bolts 12 extend through the parting faces 25 as do holes 27 for the bolts 21 which secure the pins 20 to the body member 10. The holes 26 and 27 are actually drilled through the laterally projecting ears 22.

The bridge member 11 serves to urge an indirectly operated brake pad 28 against the side of the disc opposite to that on which the directly operated pad 19 acts. The bridge member 11 is shown in detail in FIGS. 6 to 8 and includes an abutment face 29 for the indirectly operated pad 28. The abutment face 29 is provided on an outboard portion 30 strengthened by ribs 31. The bridging portion 32 of the bridge member 11 has a relatively small central aperture 47 through which parts of the brake pads 19 and 28 can be inspected, as is apparent from FIG. 1 but which is not made large enough to permit the brake pads 19 and 28 to be withdrawn radially outwardly on servicing. The inboard end of the bridge member 11 includes bosses 33 joined to one another by an arcuate portion 34.

Parting or abutment faces 35 are machined on the bosses 33 and mate with the parting faces 25 on the body member 10. The bosses 33 have tapped bores 36 to receive the bolts 12, these bores being drilled into the parting faces 35.

So that the bridge member 11 will not foul unmachined parts of the body member 10, the bridge member 11 is recessed or relieved at 37 between the parting faces 35, this recess 37 being formed on the arcuate portion 34. This recess 37 can be formed by machining but is preferably present in the bridge member 11 as cast.

As can be seen of FIG. 8 of the drawings, the bosses 33 extend somewhat radially inwardly of the bridging portion 32 so that they lie somewhat closer to the wheel axis than the outer periphery of the disc (not shown), i.e. they lie necessarily at one side of the disc. The parting plane 17 is offset in an inboard direction relative to the outboard end face 18 of the cylinder portion 16 in order to provide sufficient metal thickness for the bosses 33. Thus the arcuate portion 34 of the bridge member 11 overlies the forwardly projecting cylinder portion 16 and forms an air pocket therebetween. The air in this air pocket will tend to become heated during brake operation but this air pocket is ventilated through a slot 40 formed between the recessed arcuate portion 34 and the adjoining portion 16 of the cylinder 13. If desired the cylinder 13 could itself be recessed in this region to enlarge the slot 40.

Thus it will be seen that the ventilating slot 40 for the air pocket between the cylinder and the bridge member has been provided with ventilation means without requiring any special machining operation and that the body member 10 has been designed so that it has two separate co-planar parting faces 25 which can be machined simultaneously.

As shown in FIGS. 1 and 4, the body member 10 has lugs 41 which project radially outwardly and, as shown in FIGS. 1, 7 and 8, the bridge member 11 has similar lugs 42. The parting faces 25 and 35 extend over these lugs which thereby act to strengthen the assembly of the body member 10 and bridge member 11 against the clamp loads when the brake is operated.

The body member 10 has a boss 43 containing an inlet port 44 for the brake cylinder and two bosses 45 either one of which can be drilled to provide a bleed port 46. The bleed port 46 is formed in that one of the bosses 45 which will be uppermost when the brake caliper is mounted.

The embodiment of caliper shown in FIGS. 9 to 11 is in most respects like that of FIGS. 1 to 8 and like parts are denoted by like reference numerals. The second embodiment of FIGS. 9 to 11 differs from the first in that the boss 43' for the inlet port 44' is arranged at the radially outside of the cylinder 13 and a single boss 45' for a bleed port 46' is arranged at an angle. Also the body member 10 and the bridge member 11 do not have lugs 41 and 42.

The fixed support 24 is clearly shown in FIGS. 10 and 11 and has a pair of holes 48 to receive mounting bolts for securing the brake to a wheel mounting of the vehicle. FIG. 11 also illustrates the piston 49 which is slidable in the cylinder bore 14 and acts on the back plate of the directly operated pad 19.

We claim:

1. A disc brake caliper which comprises a body member, a bridge member and means securing said members together along a parting plane, said body member having two separate co-planar parting faces in said parting plane with respective bolt holes therein and having a cylinder portion which projects forwardly beyond said parting plane, and said bridge member having two complementary parting faces with respective bolt holes therein aligned with said bolt holes in said body member and having a recessed portion between the last-mentioned parting faces and overlying but spaced from said forwardly projecting cylinder portion of said body member, said securing means comprising two bolts passing respectively through said aligned bolt holes.

2. A disc brake caliper according to claim 1 in which said bridge member consists of a casting and said recessed portion of said bridge member is a portion formed thereon as cast.

3. A disc brake caliper according to claim 1 further comprising a fixed support and means for axially slidably mounting said body member on said support, said mounting means including a pair of axially directed pins.

4. A disc brake caliper according to claim 3 in which said body member has a pair of axially directed holes respectively in said two parting faces thereof, each of said pins being received in a respective one of the last-mentioned pair of holes.

5. A disc brake caliper according to claim 4 in which said pins are secured in said respective holes in said body member and said fixed support has a pair of axially directed bores therein in which said pins are slidably received.

6. A disc brake caliper according to claim 1 in which said bridge member has a relatively small pad inspection aperture therein.

* * * * *